Nov. 1, 1938.  C. REINHOLD  2,134,735
FLUID OPERATED APPARATUS FOR THE DELIVERY OF A FLUID OR SEMIFLUID MATERIAL
Filed March 5, 1934
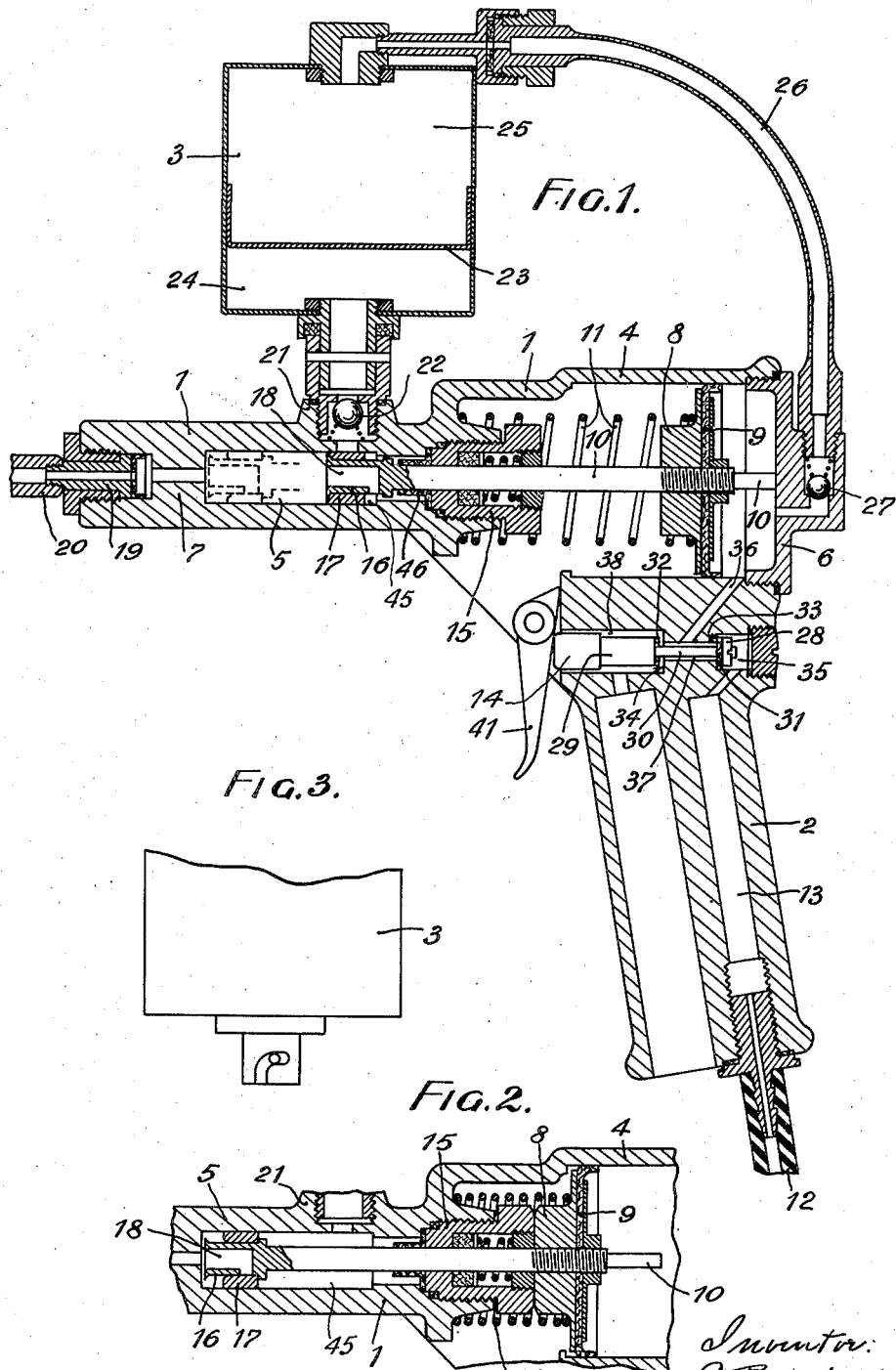
Inventor:
C. Reinhold
By E. F. Wendroth
Atty Patented Nov. 1, 1938

2,134,735

UNITED STATES PATENT OFFICE 2,134,735

FLUID OPERATED APPARATUS FOR THE DELIVERY OF A FLUID OR SEMIFLUID MATERIAL

Charles Reinhold, Geneva, Switzerland, assignor to Société d'Exploitation des Brevets Charles Reinhold, Geneva, Switzerland Application March 5, 1934, Serial No. 714,195
In Switzerland March 10, 1933

18 Claims. (Cl. 221—47.3)

The present invention relates to apparatus particularly for the delivery of a liquid material, especially grease or other relatively heavy bodied lubricant, such apparatus being commonly referred to as a pressure operated grease gun. It may also be adapted, for instance, for use as an apparatus for the delivery of the braking material in hydraulic brakes.

Said invention comprises, in preferred embodiments, an apparatus wherein delivery of the material is effected by a plunger actuated by fluid pressure, means being provided whereby, when the resistance to delivery exceeds a given value, the effective area of the plunger is automatically reduced while the fluid pressure which is applied is maintained. Thus, under what may be termed ordinary conditions, lubricant is delivered at the normal rate and pressure per unit area exerted by the plunger; if, however, due for example to some obstruction, resistance to delivery increases, then owing to the fact that the effective area of the plunger is reduced, the pressure constantly acting upon it produces an augmented pressure per unit area which is available for delivering material against the increased resistance.

The accompanying drawing represents by way of example a constructional form of the apparatus constituting a grease gun.

In the drawing:

Figure 1 is a longitudinal section of the complete apparatus ready for delivery of lubricant and Figure 2 illustrates a portion in the position occupied after delivery.

Figure 3 shows, in side elevation a detail of the connection between the storage reservoir and grease gun proper.

The apparatus shown comprises a body 1 having a generally cylindrical form and furnished with a handle 2, enabling it to be grasped in the manner of a pistol, and also with a reservoir 3 containing the lubricant to be discharged. Within the body 1 there are two co-axial cylinders 4 and 5 of different diameters, the former being closed by a screw cap 6 and the latter communicating with a passage in an extension 7 of the body 1. The cylinder 4 of large diameter contains a piston 8 having a joint ring 9, of leather for example, and is rigidly secured to a rod 10 which extends through it as indicated; a restoring spring 11 tends constantly to move the right-hand end of the rod 10, as seen in Figure 1, into contact with the cap 6. Compressed air, supplied through a flexible pipe 12, passes through a passage 13 in the handle 2, a controlling device 14 and a passage 36, for admission into the right-hand portion of the cylinder 4 for the purpose of discharging the lubricant.

The rod 10 extends from the first cylinder 4 into the second cylinder 5, of smaller diameter, through a stuffing-box 15 and is provided with a cylindrical head 16 along which a ring 17 may slide to a limited extent; the rod together with its head and the ring, form the plunger acting on the lubricant. In the head 16 there is an elbowed passage 18 affording communication between the two portions of the cylinder 5, its peripheral opening being, under certain conditions, closed by the ring 17. Into the extension 7 there is screwed or otherwise secured a small tube 19 which is intended to lead the lubricant to be discharged by way of a flexible tube 20 to the conduit system or to the receptacle to which it is desired to deliver it.

A boss 21 on the body 1 serves to receive the lubricant reservoir 3 by means of a suitable fitting, such as a bayonet joint (Figure 3), which enables this reservoir to be rapidly removed and replaced. In the fitting there is arranged a ball or other suitable non-return valve 22. The reservoir 3 is divided by a piston 23 into two chambers 24 and 25, of which the former contains the lubricant, and into the latter of which air under pressure is admitted to force the lubricant into the cylinder 5. The chamber 25 is connected by a pipe 26 and through the cap 6 to the cylinder 4; thus, when compressed air is received in the cylinder 4, the chamber 25 also receives compressed air; in the passage through the cap 6 there is inserted a ball or other suitable non-return valve 27, which prevents the air admitted into the chamber 25 from escaping through the pipe 26.

The device 14 for controlling the admission of compressed air to the cylinder 4 comprises two cylindrical lift valves 28 and 29 connected by a rod 30 and having on their opposing faces washers 31 and 32 by means of which they bear on seats 33 and 34. The valve 28 moves in a closed chamber 35 into which the passage 13 opens and which is connected to the cylinder 4 by a passage 36 leading from a space 37 surrounding the rod 30, whilst the valve 29, moves in a chamber 38 in communication with the atmosphere. A spring, not shown, tends to cause this valve 28 to bear on its seat 33, whereby communication is interrupted between the passage 13 and the cylinder 4 which is, on the contrary, put into communication with the atmosphere. If the members 28, 29 and 30 are moved as a whole towards the right as seen in Figure 1, by means such as a trigger 41, the valve 28 then allows compressed air to pass from the passage 13 into the cylinder 4 without escaping to the atmosphere, owing to the fact that the valve 29 is closed.

The operation of the constructional form described is as follows:

When the apparatus is not in use, the valve 28 interrupts all communication between the passage 13 and the cylinder 4 and, as seen in Figure 1, the pistons 8 and 16 are at the right-hand end of their stroke and the ring 17 is at the left-hand end of its stroke on the head 16 and frees the right-hand opening of the passage 18; a charge of lubricant, which has previously been transferred from the chamber 24 in the reservoir 3, is in the cylinder 5 to the left of the piston 16, 17. To force this charge of lubricant into the conduit system 20, the trigger 41 is pressed and so compressed air is admitted to the cylinder 4, moving the piston 8 and its rod 10. The ring 17 at first remains stationary in the cylinder 5 in consequence of its friction on the wall of that cylinder, but it is afterwards carried along by contact with the flange indicated on the head 16. One of two conditions may then arise—either the resistance in the conduit system 20 that it is necessary to overcome to force the charge into it is below a certain value because the conduit system is free, or this resistance is above such critical value because, for example, the said conduit system is obstructed, or for some other reason.

In the first case, movement of the piston 8 is comparatively rapid; the lubricant located in the cylinder 5 does not escape between the wall of that cylinder and the ring 17 or between said ring 17 and the head 16, on account of the light sliding fit existing between these parts and because of the viscosity of the lubricant. The head 16—channel 18 being closed by ring 17—and said ring 17 act together as a piston of relatively great area; the whole charge of the lubricant is forced into the conduit system 20. This forcing takes place, moreover, at a pressure per unit area greater than that of the compressed air, since the sectional area of the piston 16—17 is much smaller than that of the piston 8.

In the second case, the movement of the piston 8 is retarded in consequence of the greater resistance to which it is subjected; lubricant escapes over the exterior and interior surfaces of the ring 17, because of the light sliding fit of the latter with the wall of the cylinder 5 and the head 16. The lubricant flows back into chamber 45 at the right hand of ring 17 and tends to flow through the inlet opening from the reservoir 3, but is prevented from so doing by the non-return valve 22. From this time on only the cross-section of the rod 10, as it enters the cylinder, acts as a plunger. The force acting on the piston 8 is the same as in the first case, but the area of the cross-section of rod 10 is far smaller than that of the unit 16—17, so that there is obtained in the conduit system an increased pressure per unit area. This increased pressure tends to overcome the greater resistance. Such difficulty could also be met, generally speaking, by employing a higher fluid pressure, but this course results in certain obvious disadvantages, and it is one of the main objects of the present invention to enable delivery of lubricant to be effected when the resistance is abnormally high without the necessity of an augmented fluid pressure.

The admission of air into the cylinder 4 ceases at the instant at which the trigger 41 is liberated and the cylinder put into communication with the atmosphere. The spring 11 returns the piston 8 and the rod 10; in the course of this movement towards the right as seen in Figure 1, there is produced a vacuum in the left-hand portion of the cylinder 5. Hence, due to compressed air admitted into the reservoir 3 when the trigger 41 was pressed and acting on the piston 23, and to the vacuum in the cylinder 5, lubricant passes from the chamber 24 into the cylinder by way of the valve 22 and the passage 18, which is not closed by the ring 17 because during this movement it travels to and remains at the left-hand end of the head 16. The stuffing-box 15 prevents atmospheric air from then passing from the cylinder 4 into the cylinder 5 along the rod 10.

It should be observed also that, on the working stroke of the piston 8 under the action of compressed air, a vacuum is produced in the space 45, so that lubricant passes from the reservoir 3 into this space as soon as the ring 17 has passed the opening to the reservoir. During movement of the piston 8 in the opposite direction, the lubricant thus admitted passes into the cylinder 5 through the passage 18 and a complete filling thereof is thus ensured. As is shown in Figure 1, the ring 17 when at rest closes the opening to the reservoir 3 so that lubricant cannot then issue from the reservoir under the action of compressed air remaining in the chamber 25 and escape little by little through the tube 19.

It should be particularly noted that the term "liquid" has been employed herein, including the claims, as a generic term for the flowable material operated upon by the described apparatus. It is intended that the term "liquid", as used, include liquid materials of relatively great viscosity such as heavy bodied greases, so long as such liquid materials are capable of flowing under the action of the apparatus. Most satisfactory results are had when the liquid material employed is of relatively great viscosity.

The generic features of the particularized apparatus, as set forth in the following claims, may be incorporated in other types of apparatus adapted to manipulate flowable liquid material.

I claim:

1. Apparatus for delivering liquid, comprising a delivery chamber, a multi-element plunger comprised of a main portion and a sleeve encircling the same and slidably mounted thereon, the said plunger constituting a piston extending into said chamber, means for reciprocating said plunger, all of the elements of said plunger contributing to the area of the piston head when the pressure thereagainst is low, but the said sleeve being ineffective when the pressure thereagainst is relatively high.

2. Apparatus for the delivery of a liquid, in combination, a plunger, a second plunger actuating said first named plunger, effecting the delivery of material, said first plunger being constituted by a main member and an auxiliary member slidably mounted on the said main member, the two being normally movable relatively to each other, and both moving as a unit relative to the chamber and contributing to the effective area of said first named plunger in delivering said liquid when the resistance to delivery is below a given value, but only the main member contributing to the effective area of said first named plunger when the pressure increases beyond a given value, and this regardless of the position in the stroke of said first named plunger when the pressure increase is encountered.

3. Apparatus for the delivery of a liquid, in combination, a delivery cylinder, a plunger effecting the delivery of material and constituted by a main member and an auxiliary member, the main member comprising a rod extending into said delivery chamber, a ring forming the auxiliary member, the external periphery of which bears lightly on the internal surface of said delivery cylinder, said ring surrounding a portion of said rod, both of said members contributing to the effective area of the plunger for delivering said liquid when the resistance to delivery is below a given value, and means whereby the effective area of said plunger is constituted by only the cross-section of said rod when the resistance to delivery exceeds such value.

4. Apparatus for the delivery of a liquid, in combination, a delivery cylinder, a plunger effecting the delivery of material and constituted by a main member and an auxiliary member, the main member comprising a rod extending into said delivery chamber, a ring forming an auxiliary member, the external periphery of which bears lightly on the internal surface of said delivery cylinder, said ring surrounding a portion of said rod, a passage being provided in the rod for affording communication between the forward or delivery portion of the cylinder and the rear or suction portion, both of said members contributing to the effective area of the plunger for delivering said liquid when the resistance to delivery is below a given value, and means whereby the effective area of said plunger is constituted by only the cross-section of said rod when the resistance to delivery exceeds such value.

5. Apparatus for the delivery of a liquid, in combination, a delivery cylinder, a plunger effecting the delivery of material and constituted by a main member and an auxiliary member, the main member comprising a rod extending into said delivery chamber, a ring forming the auxiliary member, the external periphery of which bears lightly on the internal surface of said delivery cylinder, said ring surrounding a portion of said rod, a passage being provided in the rod for affording communication between the forward or delivery portion of the cylinder and the rear or suction portion and being adapted to be covered by the ring, which is capable of limited reciprocation relatively to the said portion of the rod, when said ring is in its rear position, both of said members contributing to the effective area of the plunger for delivering said liquid when the resistance to delivery is below a given value, and means whereby the effective area of said plunger is constituted by only the area of the cross-section of said rod when the resistance to delivery exceeds such value.

6. In apparatus for delivering liquid against pressures, a discharge cylinder having at one end a delivery passage, a plunger rod slidably extending through that end wall of the cylinder which is opposite the first stated cylinder end, for reciprocation within and without the confines of the cylinder, a limiting cylindrical slideway formed along a portion of the inner end of the plunger rod, a passage extending from the inner-end face of the plunger rod to a location at the rearward surface of the slideway, a sleeve encircling the slideway for sliding reciprocation therealong and for closing the said passage at the rearward end of its strokes, the outer circumferential surface of the sleeve bearing lightly against the inner circumferential surface of the cylinder providing a restricted clearance therebetween, and likewise the inner circumferential surface of the sleeve bearing lightly against the outer circumferential surface of the slideway, a supply passage for said liquid communicating with the cylinder adjacent the end wall thereof through which the plunger rod extends, being disposed for closure by the said sleeve when the plunger rod is in a retracted position, and a check valve operative within the supply passage to afford supply of said liquid to the chamber on the forward stroke of the plunger rod and to prevent back flow through the supply passage on the rearward stroke.

7. In combination with a cylinder adapted to contain a liquid medium, said cylinder being of uniform diameter throughout its length and having enclosing end walls, a piston operable within the cylinder by a piston rod extending tightly and slidably through one of the said end walls from the exterior of the cylinder, said piston comprising a sleeve encircling a limiting cylindrical slideway formed along a portion of the end of the piston rod which reciprocates within the cylinder, the outer circumferential surface of the sleeve bearing lightly against the inner circumferential surface of the cylinder, and the inner circumferential surface of the sleeve bearing lightly against the circumferential surface of the slideway, providing restricted clearances between such contiguous surfaces.

8. A device for manipulating a liquid to useful purpose, comprising a chamber adapted to be completely filled with the liquid; means lying adjacent one end of the chamber for applying flow of said liquid to useful purpose, said means being effective exteriorly of the chamber; means for displacing the liquid, said displacing means entering the chamber adjacent the end opposite the first stated end and being movable from the exterior of said chamber; means carried by said displacing means, the two stated means being effective in combination to force flow of the liquid toward the application end of the chamber when resistance to the flow at that end of the chamber is low; restricted opening past the said two stated means allowing back-flow of liquid therethrough when resistance to forward flow at the application end of the chamber is high, whereby the entering portion of said displacing means is alone effective to cause forward flow of liquid; and passage means providing for free flow of liquid past said two stated means during the withdrawal stroke of said displacing means from the chamber.

9. A device as recited in claim 8 wherein the stated means for applying flow of the liquid to useful purpose is a passage for the discharge of such liquid, and wherein a passage for the supply of the liquid communicates with the chamber adjacent that end thereof through which the displacing means enters, the said supply passage being provided with valve means allowing flow to the chamber during the entering stroke of the displacing means and preventing flow from the chamber during the withdrawal stroke of the displacing means.

10. A device as recited in claim 8 wherein the chamber is a cylinder, the displacing means is a rod having a cylindrical head, and the means carried by the displacing means is a ring mounted on said head for limited longitudinal sliding movement thereon, the stated restricted opening being provided by a slight clearance between the external circumferential surface of said ring and the internal circumferential surface of said cylinder and the internal circumferential surface of said ring and the external circumferential surface of the slideway formed by said head, and the stated passage means opening at the forward terminal portion of said rod and at the rearward portion of the slideway formed by said head.

11. Apparatus for the delivery of a liquid including in combination, a delivery cylinder, a plunger operative therein for effecting delivery of the liquid therefrom, said plunger comprising a member extending into the delivery cylinder from the exterior thereof, and a member mounted thereon and movable therewith, the last named member being normally additive to the effective area thereof, a reservoir for the liquid, a non-return valve connecting the reservoir with the portion of the delivery cylinder at which the said plunger enters, and means automatically rendering said last named member ineffective when the resistance to delivery exceeds a given value.

12. Apparatus as recited in claim 11 wherein a readily detachable connection, which includes the stated non-return valve, connects the reservoir with the stated portion of the delivery cylinder at which the plunger enters.

13. In a fluid operated apparatus for the delivery of a liquid, the combination of a delivery cylinder, a plunger operative therein for effecting delivery of the liquid therefrom said plunger comprising a member extending into the delivery cylinder from the exterior thereof, and a member mounted thereon and movable therewith, the last named member being normally additive to the effective area thereof, a reservoir for the liquid, a non-return valve connecting the reservoir with the portion of the delivery cylinder at which the said plunger enters, and means automatically rendering said last named member ineffective when the resistance to delivery exceeds a given value, while the applied fluid pressure is maintained at its initial value.

14. Apparatus as recited in claim 13 wherein means are provided for subjecting the liquid contained in the reservoir to the action of fluid pressure to force such liquid into the delivery cylinder.

15. Apparatus as recited in claim 13 wherein the said additive member is adapted to close the valved connection between the reservoir and the delivery cylinder while the plunger is at rest at a position adjacent the withdrawal end of its stroke.

16. Apparatus as recited in claim 13 wherein the plunger is actuated by a fluid operated cylinder and piston mechanism.

17. Apparatus as recited is claim 13 wherein the said additive member is adapted to close the valved connection between the reservoir and the delivery cylinder while the plunger is at rest at a position adjacent the withdrawal end of its stroke, wherein the plunger is actuated by a fluid operated cylinder and piston mechanism, wherein means are provided for applying fluid pressure to the liquid contents of the reservoir, and wherein there is a valve adapted to be manually operated for controlling application of fluid pressure to said cylinder and piston mechanism and to said reservoir.

18. In fluid-operated apparatus for the delivery of a liquid, a delivery chamber adapted to be maintained completely filled with the liquid, a reciprocatable plunger extending into said delivery chamber from the exterior thereof, fluid operated mechanism for reciprocating said plunger, a reservoir for the storage of the liquid, said reservoir having a valved discharge passage leading into that end portion of the delivery chamber at which the said plunger enters, means carried by the plunger for closing said discharge passage from the reservoir when the plunger is adjacent the withdrawal end of its stroke, a supply passage for fluid pressure leading to said plunger-reciprocating mechanism and communicating with said storage reservoir, and valve means controlling simultaneous supply of fluid pressure to said plunger-reciprocating mechanism and to said storage reservoir, whereby, on the force stroke of the plunger, fluid pressure aids the supply of liquid to the delivery chamber.

CHARLES REINHOLD.